United States Patent [19]
Peterson

[11] Patent Number: 4,767,244
[45] Date of Patent: Aug. 30, 1988

[54] METHOD AND APPARATUS FOR BELT SPLICE PREPARATION

[75] Inventor: Paul J. Peterson, Cuyahoga Falls, Ohio

[73] Assignee: The Goodyear Tire & Rubber Company, Akron, Ohio

[21] Appl. No.: 71,946

[22] Filed: Jul. 10, 1987

Related U.S. Application Data

[62] Division of Ser. No. 837,114, Mar. 7, 1986, Pat. No. 4,715,106.

[51] Int. Cl.4 ............................................. B23B 51/00
[52] U.S. Cl. ...................................... 408/204; 83/914; 408/207; 408/224
[58] Field of Search ............... 408/223, 224, 204, 205, 408/207, 67; 83/914

[56] References Cited

U.S. PATENT DOCUMENTS

| 3,512,519 | 5/1970 | Hall | 408/205 |
| 4,379,665 | 4/1983 | Hendershot et al. | 408/204 |
| 4,715,106 | 12/1987 | Peterson | 29/426.4 |

FOREIGN PATENT DOCUMENTS

| 1071254 | 4/1954 | France | 408/204 |
| 475611 | 11/1952 | Italy | 408/204 |
| 931764 | 7/1963 | United Kingdom | 408/204 |
| 827309 | 5/1981 | U.S.S.R. | 408/205 |
| 837603 | 6/1981 | U.S.S.R. | 408/205 |

Primary Examiner—Gil Weidenfeld
Assistant Examiner—Daniel W. Howell
Attorney, Agent, or Firm—M. R. Dion, Sr.

[57] ABSTRACT

This invention uses a unique tubular cutting tool in a method for separating individual cables from the elastomeric body of a cable-type conveyor belt. The tool bores a cylindrical path through the elastomeric body coaxial with the individual longitudinal reinforcement cables. A transverse cut is then made across the belt width which just intersects the cylindrical paths which have been made around the cables. The elastomeric material can then be removed leaving only the cables exposed. The prepared belt end is then ready for application of a mechanical or vulcanized splice. The tubular cutting tool features both circular and axial cutting edges. The tool can be utilized in a hand drill to allow on-site splice preparation of the conveyor belt.

4 Claims, 2 Drawing Sheets

METHOD AND APPARATUS FOR BELT SPLICE PREPARATION

This is a divisional of application Ser. No. 837,114, filed on Mar. 7, 1986, now U.S. Pat. No. 4,715,106.

This invention relates to cable type conveyor belts and more particularly to a method of preparing the end of a cable belt for subsequent application of a mechanical splice. A specific cutting tool suitable for use in the method is also disclosed.

BACKGROUND OF THE INVENTION

Cable belts are well known in the heavy duty conveyor belt applications. In this type of conveyor belt construction the tension bearing portion of the conveyor belt is a planar set of heavy stranded cables embedded in an elastomeric carcass. Each of the set of stranded cables are oriented longitudinally parallel to the direction of travel of the conveyor belt. Due to the very high tensile strength of each of the stranded cables the load carrying capability of such a belt is much higher than conventional fabric reinforced conveyor belts. The cable type conveyor belts also are generally of lesser thickness than plied up fabric-reinforced belting since the stranded cables supply all strength necessary to the belt. The rubber or elastomeric cover in which the cables are embedded serves only to protect the cables from abrasion and cutting by sharp or abrasive aggregate which may be transported. These cable belts are used regularly in mining and other aggregate carrying applications requiring long overland hauls of very high load capacities.

The disadvantage to the cable belt construction is that the cable belt is extremely difficult to splice due to the problems associated with fastening single cables securely to one another at the ends of the belt. Conventionally the only splice which has been found suitable to this date is a vulcanized type splice where the ends of the belt which are to be fastened together are prepared by stripping back the rubber carcass from the cables interleaving the cables from one end with the cables on the other end and then curing elastomer into place around the interleaved cables. U.S. Pat. No. 4,235,120 describes one such method of splicing. A major disadvantage of cable belt occurs when a break or rupture of the belt occurs during service and that belt must be repaired in the field. Vulcanized splicing in the field is a long, time consuming, difficult process since the curing apparatus for vulcanizing the rubber in the splice area must be transported to the field. In addition the preparation of the belt ends is a long, tedious process which has always been performed by hand. In the field preparation of a cable belt the rubber cover is slit by hand using knives for skiving. The upper and lower covers are painstakingly trimmed back and once the covers are removed the rubber must be trimmed from around the cables without cutting individual strands of the cable. If some of the filaments of the strand are cut during skiving the cable will unwind thus ruining the splice area. In handcutting around the cables it is a desirable objective to cut as close to the cable as possible while still leaving a slight layer of rubber on the cables.

It is an object of this invention to provide a method for preparation of a cable belt end for splicing in which the rubber carcass can be accurately and uniformly trimmed from around the individual stranded cables of the belt. An advantage of the invention is that the splice can be made in a fraction of the time that handcutting methods require. Another object is to provide a method which can trim the rubber from around the cable to a close tolerance without cutting individual filaments of the stranded cable.

BRIEF DESCRIPTION OF THE INVENTION

Advantages of the invention can be obtained by using a method for preparing an end of a cable belt for splicing, said cable belt including an elastomeric body having embedded therein a plurality of stranded cables aligned in a reinforcement plane extending transversely across substantially the entire width of said belt, said stranded cables extending longitudinally of the belt over its entire length, said method comprising the steps of: (a) preparing a transverse cross section of said cable belt end exposing an axial cross sectional end of each of said plurality of stranded cables; (b) positioning a cutting tool against said cross section of said cable belt and around an end of one of said plurality of stranded cables, said cutting tool having an inside diameter greater than the cross section of said stranded cable and adapted to cut circumferentially around said stranded cable over a predetermined axial length of said cable; (c) cutting a cylindrical core around said stranded cable, said cylindrical core extending for a predetermined distance through said elastomeric body along said stranded cable and co-axial therewith; (d) repeating steps (b) and (c) for each of said plurality of stranded cables; (e) cutting said elastomeric body in a cutting plane transverse of and perpendicular to said cable belt, said cutting plane intersecting each of said cylindrical cores around each of said plurality of stranded cables, said cutting plane extending through said elastomeric body at said predetermined distance from said end of said cable belt to form a separated segment of said elastomeric body; (f) exerting a force in a direction coincident with said plane of said stranded cables and directed away from said end of said cable belt to effect removal of said separated segment of said elastomeric body, thereby exposing said plurality of stranded cables over said predetermined distance.

The method of the invention can advantageously be practiced using a cutting tool for cutting cylindrical cores in rubber comprising: a tubular body having an axis of rotation; a first annular section of said tubular body with a first co-axial bore therethrough and a sharp circular cutting edge forming one end of said first annular section: said first annular section being integrally connected to a second annular section of said tubular body at the end distal said cutting edge, said second annular section having a second bore coaxial with said first bore and separated therefrom by a first tapered shoulder, and a cutting slot extending axially from proximate said first shoulder and including a minority of the periphery of said second annular section, said cutting slot having a cutting edge extending axially along one edge of said cutting slot, a third section of said tubular body integral with said second annular section forming a shaft adaptable for gripping said tool.

DETAILED DESCRIPTION OF THE INVENTION

Figure 1:
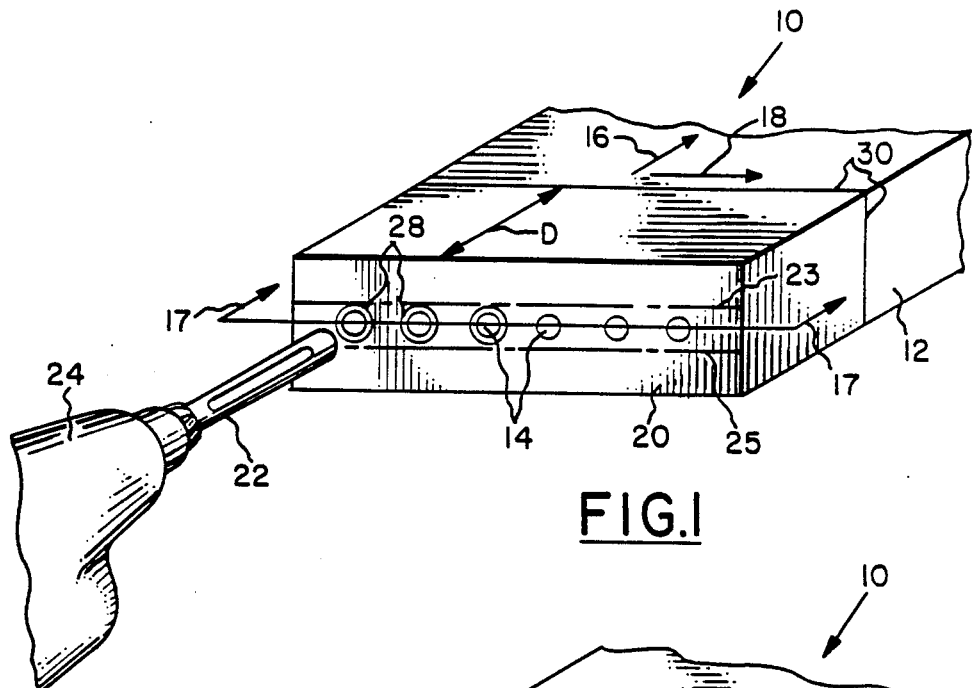
FIG. 1 is a perspective view of the end portion of a cable belt illustrating one cable being skived by the special cutting tool.
Figure 2:
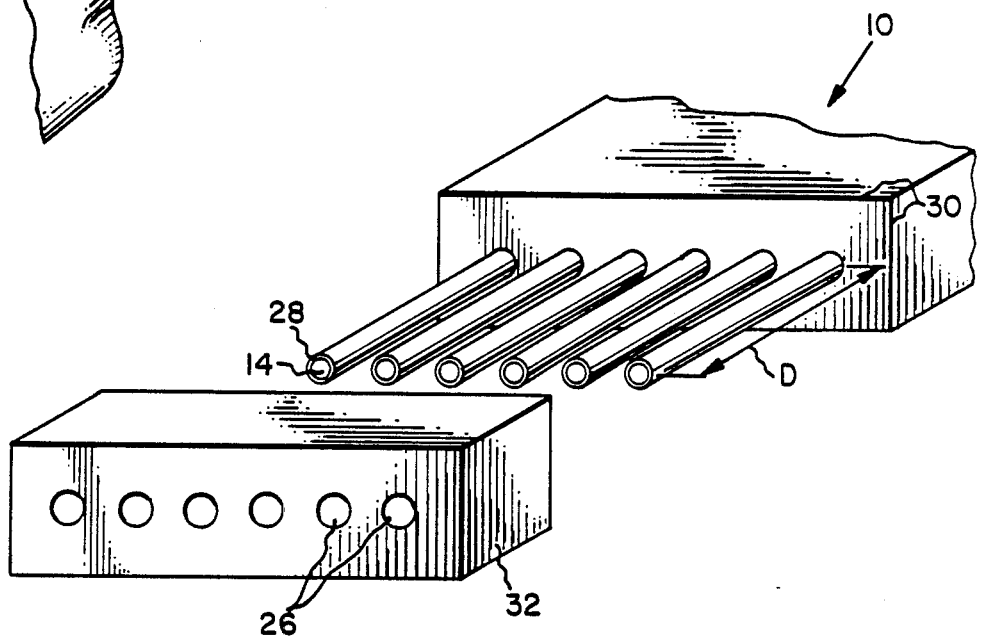
FIG. 2 is a perspective view of the belt of FIG. 1 with the elastomeric body removed from around the individual cables.

Referring now to FIGS. 1 and 2, the cable belt will be generally referred to by the reference figure 10. The cable belt 10 is composed of an elastomeric body 12 with a planar series of cables 14 oriented longitudinally of the belt. The longitudinal direction is generally indicated by the arrow 16 and is coincident with the direction of travel of the belt. The arrow 18 indicates the transverse direction as the term is used herein. The cables are aligned in a reinforcement plane 17, transverse of the belt. The reinforcement plane carries the working tension during service. The individual cables 14 are generally stranded steel cables. Aromatic polyamide, carbon fiber or filament glass cables are also materials of which the stranded cables 14 may be made. Any other metallic or non-metallic material having suitable tensile strength and tenacity is within the definition of cables useful in cable belts 10 as described in this specification. The cables 14 are generally composed of a multiplicity of filaments which has been cabled or stranded into the finished cable form and are embedded within the elastomeric body 12 to form the cable belt 10. It is understood that layers of fabric (not shown) may be incorporated above and/or below the cables 14 in order to provide protection for the cables from impinging sharp objects which penetrate the elastomeric body during service.

The cable belt 10 is being prepared for splicing using the method of this invention by preparing a squared off end section 20 in which the cross section of the cables are exposed. The belt, once it has been squared off, is secured to prevent movement and a circular tubular cutting tool 22 is centered on the axis of each cable 14 in turn. The cutting tool 22 is rotated by a suitable means for rotation such as a simple hand held drill 24 shown in FIG. 1. Once the cutting tool 22 has been positioned concentrically around the cable, sufficient pressure along the axial direction of the cable is applied by the cutting tool 22. The rotation of the cutting tool and the axial pressure bores or skives a cylindrical core 26 through the elastomeric body 12 of the cable belt 10 along the periphery of the cable 14. The axial pressure and rotation of the cutting tool 22 is maintained until the cylindrical core 26 is formed to a desired depth D along the cable length. The cutting tool 22 is moved successively along each of the cables 14 to form the cylindrical core 26 in the elastomeric body 12 to separate the cable from the body. There is ideally a small annular core 28 of rubber remaining directly adjacent the periphery of each cable 14.

A transverse cut 30 is then made across the belt in direction 18 extending through the thickness of the belt and just intersecting the cylindrical cores 26 around each cable 14. The transverse cut 30 can be accomplished by a conventional rubber cutting knife apparatus or may utilize a die which is forced through the rubber in a plane above, below and between the individual cables. Care must be exercised to prevent damage to the cables 14 during this transverse cutting step.

FIG. 2 shows the elastomeric body removed from the exposed cables 14 with their rubber cores 28 attached. The separated segment 32 of the elastomeric body 12 is discarded. In preparation for making a mechanical or vulcanized splice of the cable belt ends a second end of the same belt 10 or another belt is prepared in an identical manner prior to applying the splice. The splice may be mechanical or a vulcanized elastomeric splice. The mechanical splice can be advantageously used with this method given the ability of the method of this invention to leave a slight annular core 28 surrounding each cable. This annular core 28 assists in distributing the localized attachment stresses generally associated with most mechanical splice devices.

An alternative method of removing the separated segment 32 from the elastomeric body 12 after the completion of the cylindrical core operation with the cutting tool 22 involves slicing the elastomeric body transversely across the belt in a pair of cutting planes 23,25 just tangent to each cylindrical core 26 and parallel to the reinforcement plane 17 of the belt. The transverse cut 30 is then made perpendicular to the planar cuts to remove upper and lower portions of the elastomeric body 12 which are adjacent to the cables 14. The rubber in the interstices between the individual cables 14 then can be easily removed using a conventional rubber knife or a simple die-cutting device. In this alternative method the separated segment 32 would come in two planar segments as well as a series of small segments from the interstices between the cables 14.

The cutting tool 22 can be a simple boring tool such as is commonly used in woodworking but it must be recognized that the resilient character of rubber makes the task of boring in an elastomer a difficult operation particularly when the driving means is a hand held device such as a power drill 24 where the cutting tool 22 is chucked therein. The resilience of the rubber makes the centering of the cutting tool around the individual cables a very difficult task. Where a horizontal drill press is available and the belt end can be securely positioned, a simple cutting tool which has a toothed leading edge very similar to a metal working or wood working borer may be utilized. However, in the more frequent circumstance where a field splice is being made, the availability of such fixed apparatus is very unlikely and the use of hand held drilling tools are much more likely to be the available motive means for the cutting tool 22. In such a circumstance, a very specially designed cutting tool has been found to be preferable in the practice of the method of this invention.

Figure 3:
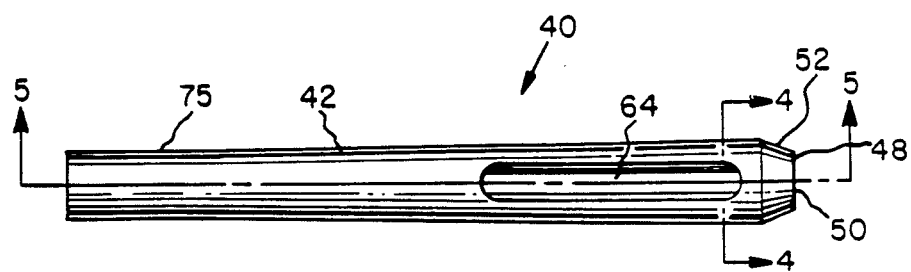
FIG. 3 is a side view of the cutting tool of the invention showing the cutting slot.
Figure 5:
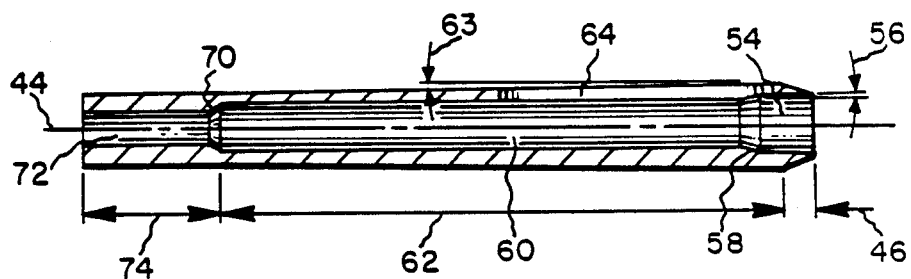
FIG. 5 is an axial cross section of the cutting tool of this invention showing the circular and longitudinal edges of the tool.
Figure 4:
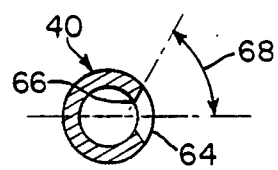
FIG. 4 is an axial cross section of the tool taken along line 4—4 in FIG. 3 showing the cutting angle of the cutting slot.

FIGS. 3, 4 and 5 illustrate a preferred cutting tool 40 which is suitable for boring cylindrical bores in a solid rubber matrix. The cutting tool 40 includes a tubular body 42 having an axis of symmetry 44. The tubular body is composed of several co-axial segments which lie along the axis 44. The first annular section 46 includes a leading edge 48 composed of a sharp circular cutting edge 50. The first annular section 46 includes also an outward taper 52 extending axially away from the cutting edge 50. The first annular section 46 contains a first bore co-axial with axis 44 having an inward taper 56. The taper 56 may be between about 10 and 20 degrees, preferably about 12 to 16 degrees. The taper 56 compresses the elastomer in the bore to assure a smooth transition through the shoulder 58 which separates the first bore 54 from the second bore 60. The shoulder 58 forms the transition between the first annular section and the second annular section 62. The second annular section 62 includes an outer surface which tapers at a taper angle 63 sufficient to alleviate the tendency of the rubber to bind during the passage of the cutting tool therethrough. The taper should be less than 10 degrees, and more preferably between 0.5 and 5 degrees. The more preferred taper has been found to be about 1 to 2 degrees. The second annular section 62 contains a cutting slot 64 which extends axially from proximate the first shoulder 58 over a distance less than the full axial length of the second annular section 62. The cutting slot 64 covers a minor portion of the circumference of the second annular section 62 when an axial cross section is taken. The slot must be narrower than the diameter of the cable being skived. The slot 64 has a cutting edge 66 which is machined at a cutting angle 68. The cutting edge accomplishes skiving of thin sections of the rubber body through which the cutting tool is passing during the rotation of the cutting tool 40. Referring briefly back to FIG. 1, the slot 64 with the cutting edge 66 provides the cylindrical core 26 around the cables 14 by skiving the thin layer of rubber from the elastomeric body 12 thus separating the cable from the body and allowing subsequent withdrawal of the separated segment 32 from the cable 14. The second shoulder 70 forms the transition between the second bore 60 and the third bore 72 which is contained in the third annular segment 74. The third annular segment 74 functions as a shaft 75 which can be chucked into the rotational motive means such as the hand drill 24. The third bore 72 is an optional feature which provides a convenient path for the skived rubber shavings from the slot 64 to escape from the cutting tool. The bore also provides a method to clean rubber out of the tool after boring. The shoulder 70 forms the stopping means for limiting the penetration of the tool 40 into the belt structure by having the cables 14 impinge on the shoulder during drilling. The second bore 60 has a diameter equal to or slightly greater than the cable 14. A slightly greater diameter allows for the inclusion of the annular core 28 of rubber as shown in FIG. 2 to remain on the outer periphery of the cable 14 after cutting is complete.

The leading edge 48 the of the tool is a smooth, non-serrated cutting surface which facilitates centering of the cutting tool on the individual cables 14 by assuring a smooth cutting action during initial contact of the rubber body 12 with cutting tool 40. The various cutting edge configurations and tapers on the interior and exterior of the cutting tool may be machined to any suitable angle. However, it has been found that in cutting rubber, the cutting edge 66 of the cutting slot 64 should be machined at the angle 68 of between 30 and 110 degrees. A preferred range is between 40 degrees and 90 degrees, and most preferably is between about 50 and about 70 degrees. The angle 68 is measured relative to plane 5-5 which bisects the slot 64 when viewed in axial cross section. It is understood that the overall wall thickness of the cutting tool is dependent upon the type of steel utilized and it is generally advantageous to minimize the wall sections of each of the annular sections of the tubular body 42 in order to minimize the degree of compression which the rubber of the belt must be subjected to. The compression of the rubber is directly proportional to wall thickness. Expressed in another way, the less the wall thickness, the less compression of the rubber and the less friction occurs on the outer periphery of the tubular body of the cutting tool 40.

Various embodiments of the invention have been set forth herein. However, various modifications in the features of construction, combination of elements and arrangement of parts may be envisioned by one skilled in the art. The scope of the invention is intended to include such modifications so long as they are encompassed by the appended claims.

What is claimed is:

1. A tool for cutting cylindrical cores in rubber comprising: a tubular body having an axis of rotation; a first annular section of said tubular body with a first co-axial bore therethrough and a sharp circular cutting edge forming one end of said first annular section; said first annular section being integrally connected to a second annular section of said tubular body at the end distal said cutting edge, said second annular section having a second bore coaxial with said first bore and separated therefrom by a first tapered shoulder, and a cutting slot extending axially from proximate said first shoulder and including a minority of the periphery of said second annular section, said cutting slot having a cutting edge extending axially along one edge of said cutting slot, a third section of said tubular body integral with said second annular section forming a shaft adaptable for gripping said tool.

2. A tool according to claim 1 wherein said first annular section includes an outward taper extending axially away from said sharp cutting edge.

3. A tool according to claim 1 wherein said second annular section narrows in outside diameter by about 0.5 to about 5 degrees from said first annular section to said third section.

4. A tool according to claim 1 wherein said first bore of said first annular section has an inside taper of about 5 degrees to about 30 degrees, said taper extending from said sharp cutting edge to said first shoulder.

* * * * *